(No Model.)
S. M. PARK.
MACHINE FOR PREPARING FEATHERS FOR DUSTERS.
No. 329,672. Patented Nov. 3, 1885.
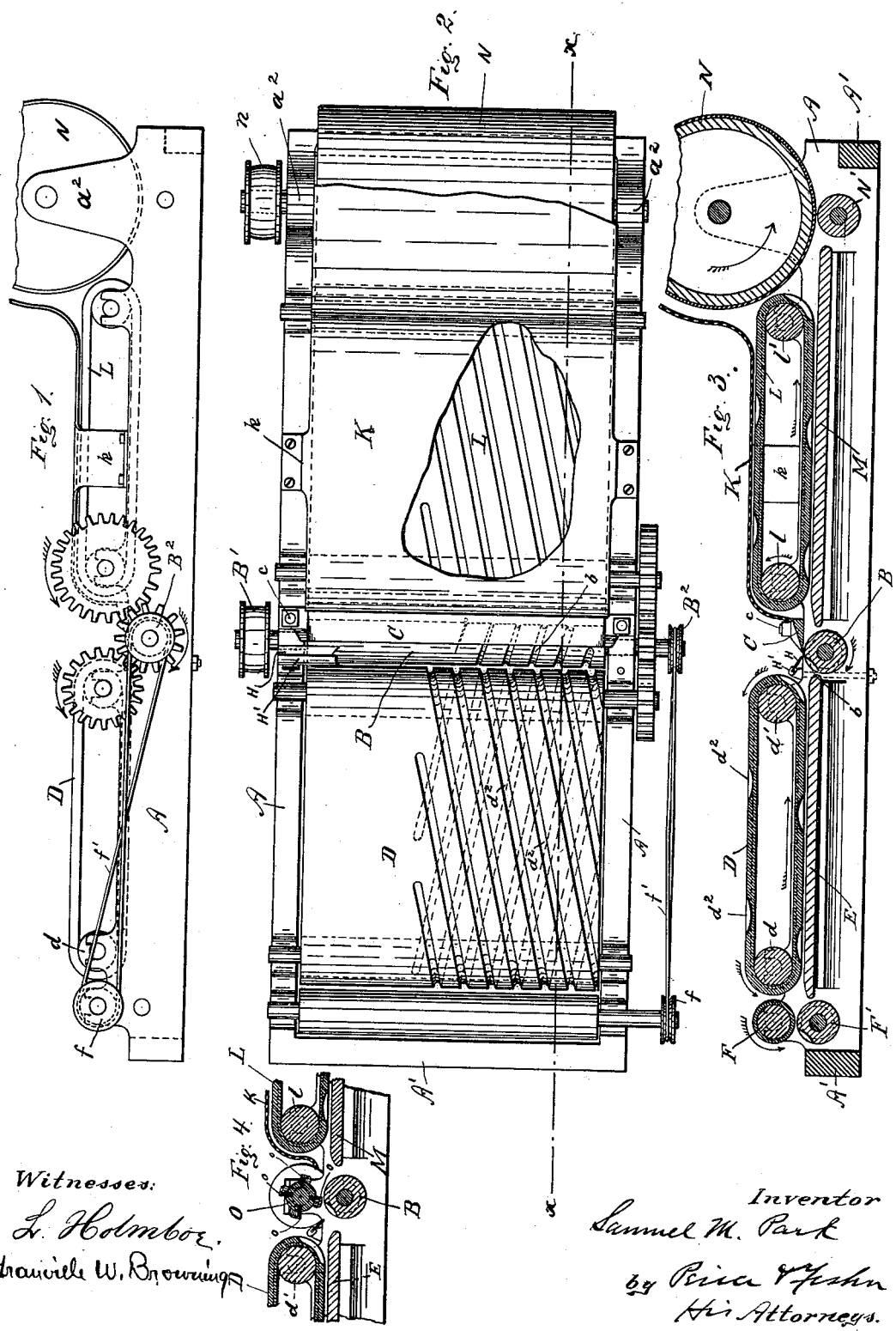
Witnesses:
L. Holmboe.
Granville W. Browning.
Inventor
Samuel M. Park
by Price & Fisher
His Attorneys.

UNITED STATES PATENT OFFICE.

SAMUEL M. PARK, OF CHICAGO, ILLINOIS.

MACHINE FOR PREPARING FEATHERS FOR DUSTERS.

SPECIFICATION forming part of Letters Patent No. 329,672, dated November 3, 1885.

Application filed April 13, 1885. Serial No. 162,144. (No model.)

*To all whom it may concern:*

Be it known that I, SAMUEL M. PARK, of Chicago, Illinois, have invented certain new and useful Improvements in Machines for Preparing Feathers for Dusters, of which I do declare the following to be a full, clear, and exact description, reference being had to the accompanying drawings, forming part of this specification.
In the manufacture of dusters from the feathers of turkeys or other common fowls it is customary to render the feathers pliable, and thus prevent their breaking, by removing the pithy portions of the stems. This is usually accomplished by first splitting the stem or shaft of the feather longitudinally in such manner as to remove the greater part of the pithy matter, and afterward passing the plume-bearing portion of the stem or shaft between sandpapering-rolls, which rasp away any pith adhering to such portion. Various attempts have heretofore been made to accomplish this longitudinal splitting of the feather-stem and removal of the pithy matter by machinery, but without entire success, for the reason that no adequate provision was made for properly and automatically presenting the thin portions of the feather-stem to the action of the splitting or cutting knife. Hence it is that in the manufacture of feather dusters the splitting of the feather-stems is almost invariably done by hand, with the aid of a knife-blade set above its guide table or roll in such manner that at one end the distance between the two will be greater than at the other, so that in the splitting operation the butt or large part of the feather-stem will be presented by hand to the knife-blade at the point where the space between the knife-edge and table is greatest, and as the feather is moved forward by the operator against the knife it is at the same time drawn toward the opposite end of the knife-blade, thus allowing the thinnest portion of the feather-stem to be split by that part of the knife-blade nearest the table or roll.

My present invention has for its primary object to provide an improved machine whereby the feathers may be automatically presented to the cutting-knife in such manner that the thinner portions of the feather-stems equally with the thicker portions will be freed from all pithy matter. This object is accomplished by the mechanism hereinafter described, illustrated in the accompanying drawings, and particularly defined in the claims at the end of the specification.

Figure 1 is a view in side elevation of my improved machine. Fig. 2 is a plan view, parts being broken away for the purpose of better illustration. Fig. 3 is a view in vertical longitudinal section on line $x$ $x$ of Fig. 2. Fig. 4 is a fractional view in vertical longitudinal section, showing a modified form of cutting-knife.

A designates the sides of the main frame of the machine, which are connected together by end bars, A', and are provided with suitable bearings or boxes for the journals of the several rollers hereinafter described. In the sides of the main frame, about midway their length, is journaled what I designate the "knife-roll" or guide B, the axle of which projects beyond the sides, and is provided at its respective ends with the drive-pulley B' and the cord-pulley B². Above the knife-roll B, and close to and preferably parallel with its perimeter, is placed the cutting-knife C, the ends of which will be suitably connected (adjustably, if desired) to the main frame, as by the bolts $c$. The perimeter of the knife-roll B has a spiral groove, $b$, formed therein, and this groove is made of gradually-decreasing depth, so that the butt or thick portion of the feather-shaft will rest within the deepest part of the groove, and as the cutting operation proceeds the feather will be moved laterally along the knife-roll until the thinnest portion of the feather-shaft leaves the roll about the vanishing point of the groove, the knife having severed that part of the feather-stem projecting above the edge of the groove.

The advantage in having the groove $b$ of gradually-decreasing depth is apparent, for it will be readily seen that if this groove were of equal depth throughout the thick portion of the feather-shaft would be cut, while the thinner or smaller portion would lie entirely within the groove, and would not, therefore, be reached by the knife. Were the spiral groove on the knife-roll of uniform depth, it would be necessary to incline the cutting-knife with respect to the roll, which I regard as the most desirable construction.

In order to properly present the feather-shaft automatically to the cutting-knife, I preferably employ the delivery-belt D, which passes over the idler $d$ and the roller $d'$, geared to the axle of the knife-roll B, and is provided on its outer surface with spiral grooves $d^2$, as seen in Fig. 2 of the drawings. This delivery-belt D extends parallel with and in close proximity to the supporting-table E, upon which the feather will rest as it is being fed forward toward the cutting-knife. Any desired number of grooves $d^2$ may be formed in the belt D; but I prefer that shown in the drawings.

I deem it advantageous to employ, in connection with the delivery-belt, the front feed-rolls, F and F', the upper one of which is preferably faced with rubber, and is geared with the knife-roll B by the pulley $f$ and cord $f'$, and the lower one of which is furnished with the spiral groove upon its perimeter similar to the knife-roll B. From this construction it will be seen that when the butt or thick end of the feather-shaft is inserted, either by hand or from a delivery-chute of an assorting-machine, between the feed-rolls F and F' at the extreme right-hand side of the machine, it will be thrust by these rolls into a groove $d^2$ of the delivery-belt D and between this belt and the table E. The feather will thus be moved forward in a straight line, but lying obliquely upon the table, until the butt of the shaft or stem enters the deep part of the groove of the knife-roll B and its end is forced against the cutting-knife C. A guide-strip, H, of rubber or other elastic material, held within a frame, H', bolted to the main frame A, is preferably employed for the purpose of directing the feather-shaft with greater certainty to the cutting-knife. As the cutting-knife C bisects the feather-shaft, the pithy portion is split away from the plume-bearing portion and passes above the knife and over the top of the shield K, that is connected to the main frame by means of the dependent lugs $k$. Behind the cutting-knife and beneath the shield K is placed the discharge-belt L, which is grooved similarly to the delivery-belt, and by means of the rollers $l$ and $l'$ is carried parallel with and in close proximity to the supporting-table M. The axle of the roller $l$ of the discharge-belt is geared to the axle of the knife-roll in the same manner as is the axle of the roller $d$ of the delivery-belt, so that these belts and the knife-roll will work in unison and insure the proper movement of the feather with respect to the cutting-knife.

At the back part of the main frame are formed the upright bearings $a^2$, in which is journaled the axle of the abrading roll N, which derives motion from the drive-pulley $n$, and the surface of which is covered with sand-paper or other suitable material. Beneath the abrading-roll is journaled the supporting roll or idler N', upon which the feather-shaft rests during the abrading operation. It will thus be seen that the feather is passed by the discharge-belt beneath the abrading-roll, which serves to remove such particles of pith as adhere to the split shaft or stem after leaving the cutting-knife.

Instead of a cutting-blade, C, as above described, a rotary cutter-head, O, suitably driven from the source of power, and having a series of blades, $o$, therein, may be employed, if desired, although I regard the cutting-blade as the preferable construction. So, also, without departing from my invention, grooved rollers may be substituted for the grooved belts, although it is not believed that in practice they will prove as satisfactory.

My present invention is designed to cover, broadly, the use of a grooved guide for presenting the feather-shaft to the cutting-knife, and it will be readily understood that the details of construction above set out may be varied within wide limits.

Having thus described my invention, what I claim as new, and desire to secure by Letters Patent, is—

1. In a machine for preparing feathers for dusters, the combination, with the cutting-knife, of a spirally-grooved movable guide for the feather, substantially as described.

2. In a machine for preparing feathers for dusters, the combination, with the cutting-knife, of a knife roll or guide having a spiral groove of gradually-decreasing depth, substantially as described.

3. In a machine for feathers for dusters, the combination, with a cutting-knife and a knife-roll, of a guide-blade in front of the cutting-knife, substantially as described.

4. In a machine for preparing feathers for dusters, the combination, with the cutting-knife, of a supporting-table and a spirally-grooved delivery belt or surface for presenting the feather to the knife, substantially as described.

5. In a machine for preparing feathers for dusters, the combination, with the cutting-knife and the spirally-grooved knife roll or guide, of the spirally-grooved delivery-belt in gear with the knife-roll, substantially as described.

6. In a machine for preparing feathers for dusters, the combination, with the cutting-knife, of the spirally-grooved discharge-belt and its supporting-table, substantially as described.

7. In a machine for preparing feathers for dusters, the combination, with the cutting-knife, of the spirally-grooved discharge-belt, its supporting-table, and the sandpapering-rolls, substantially as described.

8. In a machine for preparing feathers for dusters, the combination, with the cutting-knife, of the spirally-grooved delivery-belt and its supporting-table, and the front feed-rolls, one of which is spirally grooved, substantially as described.

9. In a machine for preparing feathers for dusters, the combination, with the cutting-knife and the discharge-belt, of the hood extending over said discharge-belt, substantially as described.

In testimony whereof I have hereunto set my hand this 6th day of April, 1885.

SAMUEL M. PARK.

Witnesses:
GEO. P. FISHER, Jr.,
JAMES H. PEIRCE.